(12) United States Patent  
Xu et al.

(10) Patent No.: US 7,409,108 B2  
(45) Date of Patent: Aug. 5, 2008

(54) METHOD AND SYSTEM FOR HYBRID RIGID REGISTRATION OF 2D/3D MEDICAL IMAGES

(75) Inventors: Chenyang Xu, Allentown, NJ (US); Xiaolei Huang, Piscataway, NJ (US); Frank Sauer, Princeton, NJ (US); Christophe Chefd'hotel, Princeton, NJ (US); Jens Gühring, Langensendelbach (DE); Sebastian Vogt, Princeton, NJ (US); Yiyong Sun, Lawrenceville, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 737 days.

(21) Appl. No.: 10/946,204

(22) Filed: Sep. 21, 2004

(65) Prior Publication Data

US 2005/0094898 A1 May 5, 2005

Related U.S. Application Data

(60) Provisional application No. 60/504,873, filed on Sep. 22, 2003.

(51) Int. Cl.
*G06K 9/32* (2006.01)
*G06K 9/68* (2006.01)

(52) U.S. Cl. .................... 382/294; 382/220

(58) Field of Classification Search ............... 382/190, 382/195, 201, 206, 220, 274, 276, 294; 345/589, 345/594, 419, 427, 662, 639
See application file for complete search history.

(56) References Cited

U.S. PATENT DOCUMENTS

| | | | | |
|---|---|---|---|---|
| 4,700,400 A | * | 10/1987 | Ross | .......................... 382/205 |
| 6,243,106 B1 | * | 6/2001 | Rehg et al. | ................... 345/473 |
| 6,430,307 B1 | * | 8/2002 | Souma et al. | ............... 382/118 |
| 6,690,725 B1 | * | 2/2004 | Abdeljaoud et al. | ..... 375/240.08 |
| 7,177,486 B2 | * | 2/2007 | Stewart et al. | ............... 382/294 |

* cited by examiner

*Primary Examiner*—Kanji Patel
(74) *Attorney, Agent, or Firm*—Donald B. Paschburg

(57) ABSTRACT

A method of aligning a pair of images with a first image and a second image, wherein said images comprise a plurality of intensities corresponding to a domain of points in a D-dimensional space includes identifying feature points on both images using the same criteria, computing a feature vector for each feature point, measuring a feature dissimilarity for each pair of feature vectors, wherein a first feature vector of each pair is associated with a first feature point on the first image, and a second feature vector of each pair is associated with a second feature point on the second image. A correspondence mapping for each pair of feature points is determined using the feature dissimilarity associated with each feature point pair, and an image transformation is defined to align the second image with the first image using one or more pairs of feature points that are least dissimilar.

42 Claims, 2 Drawing Sheets

METHOD AND SYSTEM FOR HYBRID RIGID REGISTRATION OF 2D/3D MEDICAL IMAGES

CROSS REFERENCE TO RELATED UNITED STATES APPLICATIONS

This application claims priority from "A Hybrid Rigid Registration Method for 2D/3D Medical Images", Provisional Patent Application No. 60/504,873 of Xu, et al., filed Sept. 22, 2003, the contents of which are incorporated herein by reference.

BACKGROUND OF THE INVENTION

Image registration aims to spatially align one image to another. For that purpose, parameters of a global transformation model, such as rigid, affine or projective, are to be recovered to geometrically transform a moving image to achieve high spatial correspondence with a fixed image. The problem has been studied in various contexts due to its significance in a wide range of areas, including medical image fusion, remote sensing, recognition, tracking, mosaicing, and so on.

Rigid registration of 2D/3D medical images is a vital component of a large number of registration and fusion applications. In the areas of diagnosis, planning, evaluation of surgical and radio-therapeutical procedures, typically multiple single-modality, or multi-modality images are acquired in the clinical track of events. Since these images are complementary to each other, the integration of useful data from separate images are often desired. Rigid registration, a first step in this integration process, aims to bring the multiple images involved into spatial alignment.

Existing methods for image registration can largely be classified into three categories: feature-based methods, intensity-based methods, and hybrid methods that integrate the previous two. Feature-based methods use sparse geometric features such as points, curves, and/or surface patches, and their correspondences to compute an optimal transformation. These methods are relatively fast. However, the main critiques of this type of methods in the literature are the robustness of feature extraction, the accuracy of feature correspondences, and the frequent need of user interaction. Intensity-based registration methods operate directly on the intensity values from the full image content, without prior feature extraction. These methods have attracted much attention in recent years since they can be made fully automatic and can be used for multimodality image matching by utilizing appropriate similarity measures. However, these methods tend to have high computational cost due to the need for optimization on complex, non-convex energy functions. In addition, they require the poses of two input images be close enough to converge to a local optimum. Furthermore, they often perform poorly when partial matching is required.

Recently, several hybrid methods are proposed that integrate the merits of both feature-based and intensity-based methods. Most focus on incorporating user provided or automatically extracted geometric feature constraints into the intensity-based energy functionals to achieve smoother and faster optimization. Typically they are more flexible, and designed in such way that either intensity (gray values, gradients) information is incorporated into a feature-based algorithm, or feature (points, surfaces) information is introduced to a pixel/voxel intensity-based algorithm. The hybrid methods are expected to be more efficient and robust than the pure-feature, or pure-intensity based methods

SUMMARY OF THE INVENTION

A hybrid rigid registration method uses extracted features and feature correspondences. The method is expected to provide a fast (real time), robust, working registration system that can be used in practical applications on a regular basis. During registration, good salient anatomical features are treated differently from other pixels/voxels. They are used in the initial iterations and given much higher weights. By explicitly looking for salient anatomical feature correspondences, and using the correspondences to estimate a transformation, a registration result is provided having a satisfactory validation outcome.

In one aspect of the invention there is provided a method of aligning a pair of images with a first image and a second image, wherein the images comprise a plurality of intensities corresponding to a domain of points in a D-dimensional space. The method includes identifying feature points on both images using the same criteria, computing a feature vector for each feature point, measuring a feature dissimilarity for each pair of feature vectors, wherein a first feature vector of each pair is associated with a first feature point on the first image, and a second feature vector of each pair is associated with a second feature point on the second image, determining a correspondence mapping for each pair of feature points using the feature dissimilarity associated with each feature point pair; and defining an image transformation to align the second image with the first image using one or more pairs of feature points that are least dissimilar.

In further aspect of the invention, the steps of identifying feature points, computing a feature vector, measuring a feature dissimilarity, determining a correspondence mapping, and defining an image transformation are repeated for a predetermined number of iterations.

In a further aspect of the invention, the steps of identifying feature points, computing a feature vector, defining a feature dissimilarity, determining a correspondence mapping, and defining an image transformation are repeated until the transformed second image differs from the first image by a predetermined error.

In a further aspect of the invention, the criteria for identifying feature points include selecting points whose local intensity variance is a maximum.

In a further aspect of the invention, the criteria for identifying feature points include selecting points with a high local curvature.

In a further aspect of the invention, feature vector components are selected from a group that includes the coordinates of the feature point, the intensity associated with the feature point, the local curvature associated with the feature point, a histogram of local neighborhood intensity values, and intensity values of the neighborhood points.

In a further aspect of the invention, the dissimilarity of a pair of feature vectors can be measured by a distance between the respective feature vectors of the pair of vectors.

In a further aspect of the invention, the distance between the respective feature vectors is selected from a group that includes a Euclidean distance, a Mahalanobis distance, a normalized cross-correlation, and a mutual information.

In a further aspect of the invention, the method includes determining a correspondence mapping for each pair of feature points includes associating each feature vector on the first image with the closest feature vector on the second image, as determined by the smallest dissimilarity measure between the feature vector on the first image and each feature vector on the second image.

In a further aspect of the invention, the method includes determining a correspondence mapping for each pair of feature points includes assigning an edge associating every feature vector on the first image to every feature vector on the second image, and assigning a weight to each edge.

In a further aspect of the invention, the weight assigned to each edge is based on the dissimilarity of the two associated feature vectors.

In a further aspect of the invention, the method includes ordering the edges based on the weight, and selecting the feature points associated with feature vector pairs with the highest weight to define the transformation between the second image and the first image.

In a further aspect of the invention, the method comprises identifying feature regions of interest, wherein a feature region comprises a feature point and a neighborhood of points about the feature point, and wherein the dissimilarity of two feature regions is measured over all of the corresponding points of a pair of feature regions.

In a further aspect of the invention, a user using a user interface can add a feature point, remove a feature point, add a correspondence, and can remove a correspondence.

In a further aspect of the invention, the intensity corresponding to each image point on each image is a color intensity vector.

In a further aspect of the invention, the color intensity vector comprises red, green and blue intensity values, respectively.

In a further aspect of the invention, the image transformation can be defined by a least squares procedure.

In another aspect of the invention, a program storage device readable by a computer, tangibly embodying a program of instructions executable by the computer to perform the method steps for transforming a first image of a pair of images into a second image of said pair is provided.

DETAILED DESCRIPTION OF THE PREFERRED EMBODIMENTS

Figure 1:
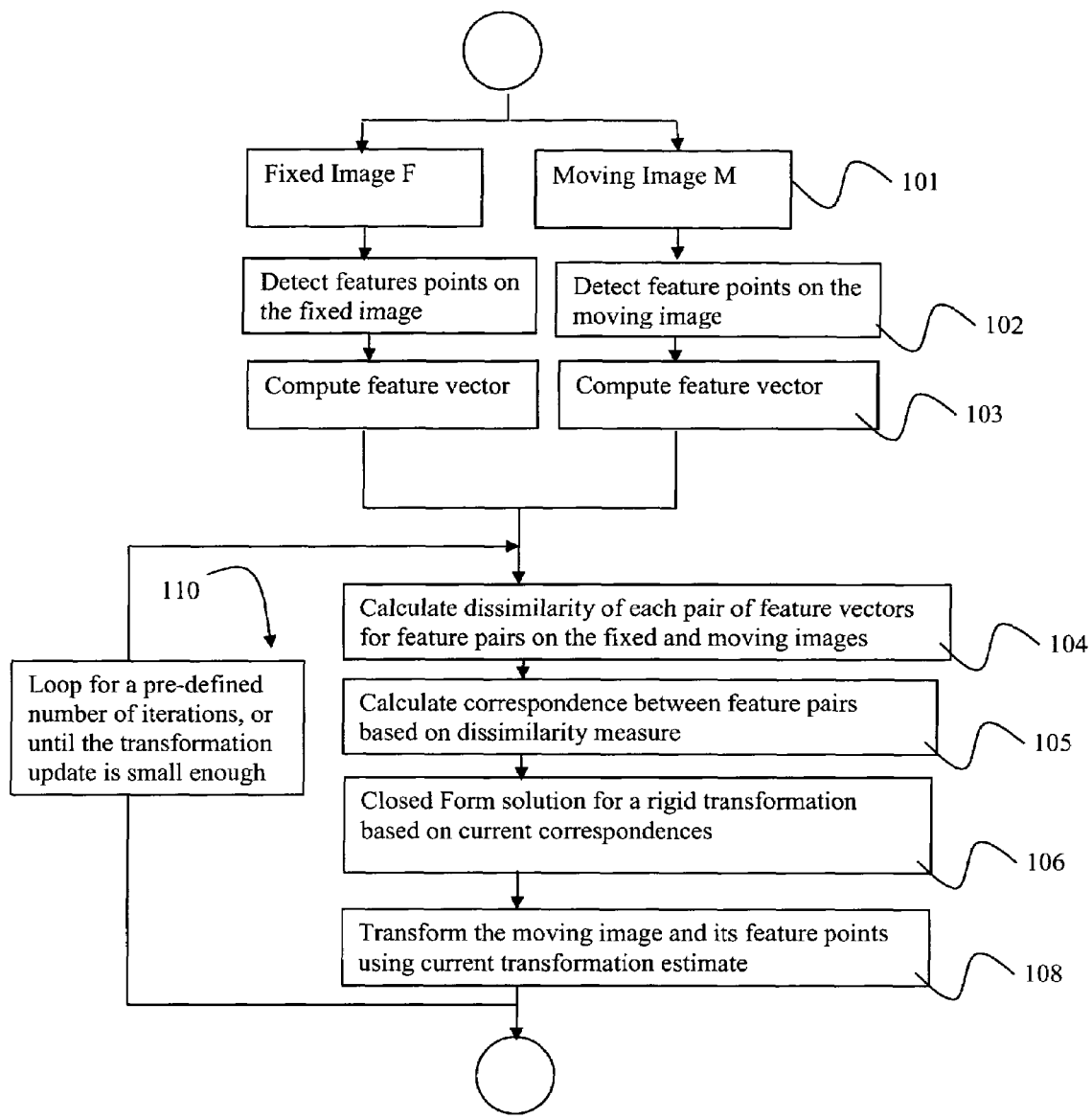
FIG. 1 depicts a flow chart for the hybrid rigid registration framework

The hybrid registration methods herein disclosed provide a generic, flexible framework in which an efficient algorithm can be developed for registration in various applications. FIG. 1 depicts a flow chart illustrating the steps of a preferred fast hybrid registration algorithm. Although the hybrid registration methods disclosed herein are described using a 2D image as an example, the methods disclosed can readily be applied to matching feature points in 3D or higher dimensional images.

As a first step, step 101, a fixed image and a moving image are provided, and feature points on the two images are detected at step 102. Feature points on both the fixed image and the moving image should be identified using the same salient feature criterion. The feature selection criterion can be designed to prefer features that are present in both images, and features that are relatively unique. One potential feature involves local gray value (intensity) variance maxima points. By way of example, consider a 2D image whose domain is a rectangular grid. For each pixel, one considers the intensity of that pixel, and the variation of pixel intensities of neighboring pixels with respect to the pixel under consideration. For a 2D image, exemplary neighborhoods are 3×3 or 5×5 pixels, although bigger neighborhoods are within the scope of the invention. In a 3D image, one would consider neighborhoods of 3×3×3 pixels, 5×5×5 pixels, etc., about each pixel under consideration. Similarly, one can define neighborhoods for higher dimensional images. A pixel whose intensity exhibits a large variance with respect to the intensity of its neighboring pixels is at a local intensity maximum (or minimum). Such a pixel is likely to be a salient feature point on the image. Another potential feature involves local high curvature points. Since curvature is the rate of change of the derivative of the intensity values and involves evaluating second-differences about each pixel, one needs to consider neighborhoods of at least 5×5 in 2D, 5×5×5 in 3D, etc. A pixel whose intensity has a very high curvature relative to its neighbors is again a likely salient feature candidate. An extreme case of a pixel with a high curvature is a pixel whose intensity is a corner point.

A 2D digital medical image can have up to 512×512 pixels or more, or approximately $250 \times 10^3$ pixels. In selecting salient feature points for consideration, one seeks to reduce the number of image points being considered by several orders of magnitude.

Once feature points have been identified in both the fixed and moving images, a feature vector is computed for every feature point at step 103. The feature vector components include enough information so as to make a feature distinctive. Feature vector components can include the coordinates of the pixel (x and y in 2D, x, y, and z in 3D, etc.), the intensity level associated with the pixel, or invariant geometric properties such as the local curvature associated with the pixel. Information about the neighborhood can also be included, such as, for example, a histogram of local neighborhood intensity values, or the intensity values of the neighboring pixels themselves. This list of properties to be included in a feature vector is illustrative, and other characteristics of a feature point can be included as needed. Thus, a feature point is potentially unlimited in the number of components it can have, although useful embodiments have from about 4 to about 20 components. However, the additional information associated with each feature point would still be less than if one considered every pixel in the image when aligning the fixed and moving image.

The next step is to determine feature correspondences between feature points on the fixed and current moving image. If one had the same number of feature points on the fixed image and the current moving image, then the possibility exists that every feature point on the fixed image corresponds to a feature point on the current moving image, and vice versa. However, the possibility exists that some number of feature points on the fixed image have do not appear in the moving image, and an equal number of feature points not in the fixed image have appeared in the moving image. More generally, where we denote the fixed image by $I_f$ and the moving image by $I_m$, with $N_f$ and $N_m$ feature points, respectively, $N_f$ and $N_m$ will be unequal, and there will be feature points disappearing from the fixed image and feature points reappearing on the moving image.

A dissimilarity $D_{i,j}$ can be defined at step 104 between the ith feature point $P_i$ of image $I_f$ and the jth feature point $P_j$ of image $I_m$ by the distance between the respective feature vectors, $V_i$ and $V_j$, respectively. The smaller the magnitude of the dissimilarity measure, the more likely the correspondence between the feature vectors $V_i$ and $V_j$. The distance metric for each component is flexible according to the nature of the feature component. One possibility for geometric components of the feature vector is to use the Euclidean distance, with $D_{ij}=((V_i-V_j)(V_i-V_j)^T)^{1/2}$. Another possibility that takes into account the statistical properties of the feature vectors is the Mahalanobis distance, defined as $D^{ij}=((V_i-V_j)S_{ij}^{-1}(V_i-V_j)^T)^{1/2}$ where $S_{ij}^{-1}$ is the inverse covariance matrix of the feature vectors. For intensity components of the feature vector, other dissimilarity measures are possible. For example, one can define the dissimilarity using a normalized cross correlation by $$D_{ij} = \frac{\sigma(V_i, V_j)}{\sigma(V_i)\sigma(V_j)}$$

where σ is a variance (or covariance). Similarly, one can use the mutual information of the two feature vectors, defined by $D_{ij}=-\Sigma p(V_i)\log p(V_i)-\Sigma p(V_j)\log p(V_j)+\Sigma p(V_i,V_j)\log p(V_i,V_j)$, where p(V) is a probability density for the feature vectors, $p(V_i,V_j)$ is a joint probability density, and the sums are over the components of the feature vectors.

Having defined a dissimilarity for each pair of feature vectors, one can now determine at step 105 the correspondence mapping between pairs of feature points on the fixed image and the moving image. There are several potential method for doing this. One possibility is, for every feature point on the fixed image, define its corresponding feature point on the moving image as the moving feature point with the closest feature vector, or equivalently, the smallest dissimilarity measure. Another method involves a weighted bipartite graph matching algorithm. In this method, the feature points on the fixed image form the first set of nodes of the bipartite graph, and the moving image feature points form the second set of nodes. With an edge connecting every fixed image feature point to every moving image feature point, forming a one-to-one mapping between the two feature point sets, a weight based on the dissimilarity measure can be assigned to each edge. One possibility of weighting the edges is to base the weighting of an edge on the reciprocal of the dissimilarity measure for that edge. In this system, two feature points that are close to each other will have a small dissimilarity measure, and thus a large weight, while a large dissimilarity will have a correspondingly small weighting factor.

Assigning a weight factor to each pair of detected correspondence helps to account for feature ambiguities, such as a fixed image feature point disappearing on the moving image, or new feature point appearing on the moving image with no correspondence on the fixed image. For example, a feature point on one image that has no corresponding feature point on the other image will have dissimilar feature vectors, so a weighting based on the dissimilarity measure will be small in magnitude. On the other hand, a feature points on the image that correspond to each other will have similar feature vectors, thus small dissimilarity measures and large weighting factors. Thus, the weighting factor of an edge can reflect the confidence level on the accuracy of the correspondence.

One can also use the weights assigned to each correspondence to order the correspondences according to level of confidence. Using one or more of the most confident correspondences, a closed-form rigid transformation can be defined at step 106 on the moving image to bring it into correspondence with the fixed image at step 108 (or conversely, on the fixed image to bring it into correspondence with the moving image). The transformation can be derived by solving a least squares problem.

By way of example, the transformation is applied to the moving image. After calculating a current transformed image estimate, one can relax the criteria for inclusion of salient feature points to add more feature points. One can then repeat at step 210 the steps of defining feature vectors, calculating dissimilarity measure for feature pairs, determining correspondences, and recalculating a current transformation for either a predetermined number of iterations, or until the currently transformed image has converged sufficiently close to the fixed image. By using only good features in the beginning, and adding more and more features after each iteration, the efficiency of the feature-based methods can be achieved with the converged accuracy of the intensity-based methods.

In another variation, instead of finding feature points of interest, small regions, i.e. image neighborhoods of interest can be pursued, and accordingly, the similarity measure between two feature regions can be defined incorporating all the pixels/voxels in the regions. One method for detecting feature regions includes computing a local differential entropy measure as disclosed in co-pending patent application "Method and System for Hybrid Rigid Registration Based on Joint Correspondences between Scale-Invariant Salient Region Features" of Xu, et al, filed concurrently herewith, attorney docket number 2003P14506US.

In another variation, the image is a color image, wherein the intensity associated with each point in the image is a vector of red, green and blue intensity values, instead of a grey level intensity. Feature points can then be selected based on the intensity of a single color, or can be based on the overall magnitude of the color intensity vector. In addition, the color intensity values can be included among the components of the feature vector.

In another embodiment, expert knowledge can be incorporated, by allowing user interactive feature editing and correspondence editing. A user interface can be developed to allow experts to add more anatomically significant feature points, or remove poor automatically detected points. Experts can also edit the automatically detected correspondences.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 2:
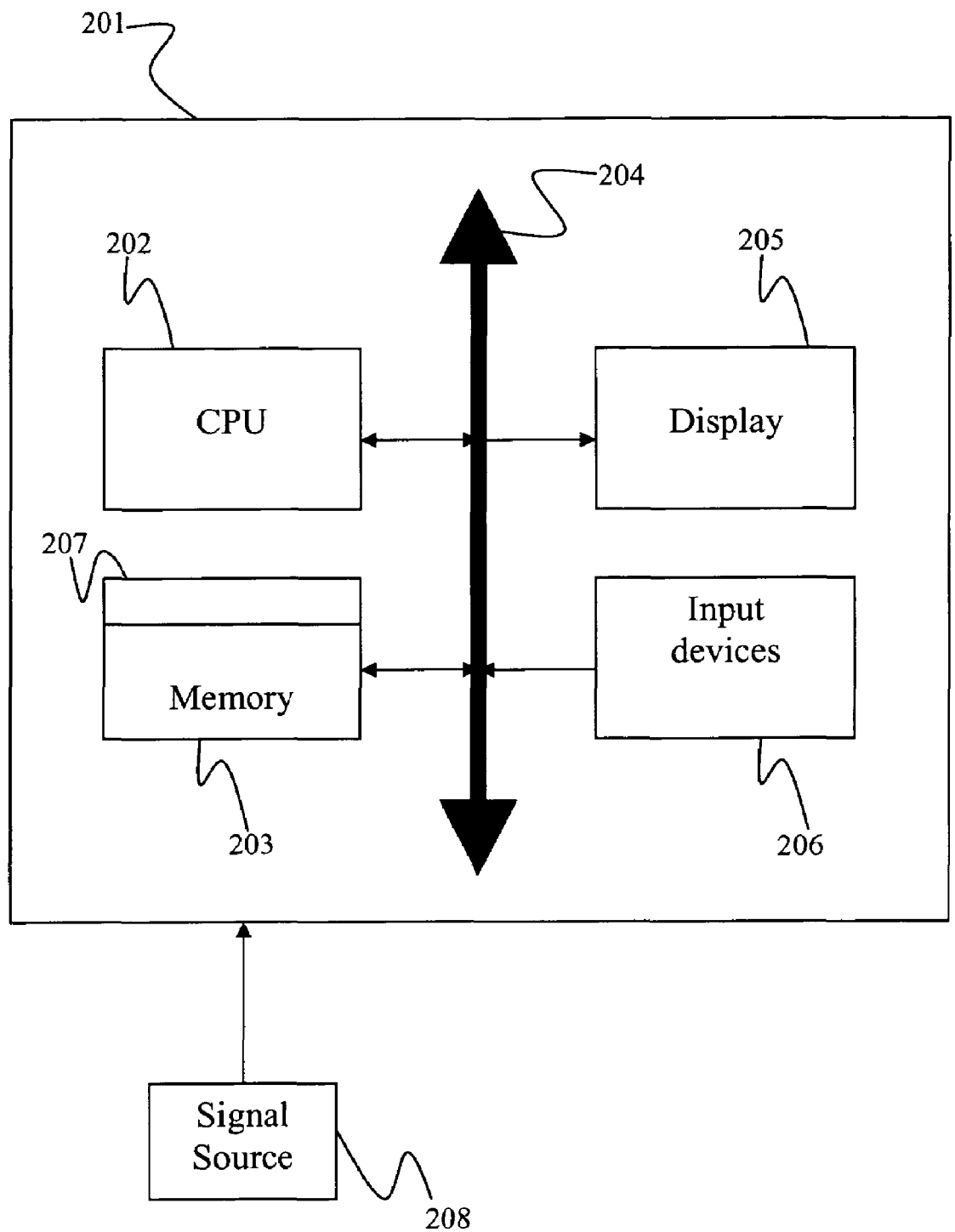
FIG. 2 depicts an exemplary computer system for implementing a preferred embodiment of the invention.

Referring now to FIG. 2, according to an embodiment of the present invention, a computer system 201 for implementing the present invention can comprise, inter alia, a central processing unit (CPU) 202, a memory 203 and an input/output (I/O) interface 204. The computer system 201 is generally coupled through the I/O interface 204 to a display 205 and various input devices 206 such as a mouse and a keyboard. The support circuits can include circuits such as cache, power supplies, clock circuits, and a communication bus. The memory 203 can include random access memory (RAM), read only memory (ROM), disk drive, tape drive, etc., or a combinations thereof. The present invention can be implemented as a routine 207 that is stored in memory 203 and executed by the CPU 202 to process the signal from the signal source 208. As such, the computer system 201 is a general purpose computer system that becomes a specific purpose computer system when executing the routine 207 of the present invention.

The computer system 201 also includes an operating system and micro instruction code. The various processes and functions described herein can either be part of the micro instruction code or part of the application program (or combination thereof) which is executed via the operating system.

In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of aligning a pair of images comprising the steps of:
    providing a pair of images with a first image and a second image, wherein said images comprise a plurality of intensities corresponding to a domain of points in a D-dimensional space,
    identifying feature points on both images using the same criteria;
    computing a feature vector for each feature point;
    measuring a feature dissimilarity for each pair of feature vectors, wherein a first feature vector of each pair is associated with a first feature point on the first image, and a second feature vector of each pair is associated with a second feature point on the second image;
    determining a correspondence mapping for each pair of feature points using the feature dissimilarity associated with each feature point pair, wherein determining a correspondence mapping for each pair of feature points includes assigning an edge associating every feature vector on the first image to every feature vector on the second image, and assigning a weight to each edge; and
    defining an image transformation to align the second image with the first image using one or more pairs of feature points that are least dissimilar.

2. The method of claim 1, wherein the steps of identifying feature points, computing a feature vector, measuring a feature dissimilarity, determining a correspondence mapping, and defining an image transformation are repeated for a predetermined number of iterations.

3. The method of claim 1, wherein the steps of identifying feature points, computing a feature vector, defining a feature dissimilarity, determining a correspondence mapping, and defining an image transformation are repeated until the transformed second image differs from the first image by a predetermined error.

4. The method of claim 1, wherein the criteria for identifying feature points include selecting points whose local intensity variance is a maximum.

5. The method of claim 1, wherein the criteria for identifying feature points include selecting points with a high local curvature.

6. The method of claim 1, wherein feature vector components are selected from a group that includes the coordinates of the feature point, the intensity associated with the feature point, the local curvature associated with the feature point, a histogram of local neighborhood intensity values, and intensity values of the neighborhood points.

7. The method of claim 1, wherein the dissimilarity of a pair of feature vectors can be measured by a distance between the respective feature vectors of the pair of vectors.

8. The method of claim 7, wherein the distance between the respective feature vectors is selected from a group that includes a Euclidean distance, a Mahalanobis distance, a normalized cross-correlation, and a mutual information.

9. The method of claim 1, wherein determining a correspondence mapping for each pair of feature points includes associating each feature vector on the first image with the closest feature vector on the second image, as determined by the smallest dissimilarity measure between the feature vector on the first image and each feature vector on the second image.

10. The method of claim 1, wherein the weight assigned to each edge is based on the dissimilarity of the two associated feature vectors.

11. The method of claim 1, further including ordering the edges based on the weight, and selecting the feature points associated with feature vector pairs with the highest weight to define the transformation between the second image and the first image.

12. The method of claim 1, further comprising identifying feature regions of interest, wherein a feature region comprises a feature point and a neighborhood of points about the feature point, and wherein the dissimilarity of two feature regions is measured over all of the corresponding points of a pair of feature regions.

13. The method of claim 1, further comprising:
    adding a feature point;
    removing a feature point;
    adding a correspondence; and
    removing a correspondence, wherein the steps of adding a feature point, removing a feature point, adding a correspondence, and removing a correspondence are performed by a user interacting with the method by means of a user interface.

14. The method of claim 1, wherein the intensity corresponding to each image point on each image is a color intensity vector.

15. The method of claim 14, wherein the color intensity vector comprises red, green and blue intensity values, respectively.

16. The method of claim 1, wherein the image transformation can be defined by a least squares procedure.

17. A computer readable program storage device, tangibly embodying a program of instructions executable by the computer to perform the method steps for transforming a first image of a pair of images into a second image of said pair, wherein said images comprise a plurality of intensities corresponding to a domain of points in a D-dimensional space, said method comprising the steps of:
    identifying feature points on both images using the same criteria;
    computing a feature vector for each feature point;
    measuring a feature dissimilarity for each pair of feature vectors, wherein a first feature vector of each pair is associated with a first feature point on the first image, and a second feature vector of each pair is associated with a second feature point on the second image;

determining a correspondence mapping for each pair of feature points using the feature dissimilarity associated with each feature point pair, wherein determining a correspondence mapping for each pair of feature points includes assigning an edge associating every feature vector on the first image to every feature vector on the second image, and assigning a weight to each edge; and defining an image transformation to align the second image with the first image using one or more pairs of feature points that are least dissimilar.

18. The computer readable program storage device of claim 17, wherein the steps of identifying feature points, computing a feature vector, measuring a feature dissimilarity, determining a correspondence mapping, and defining an image transformation are repeated for a predetermined number of iterations.

19. The computer readable program storage device of claim 17, wherein the steps of identifying feature points, computing a feature vector, defining a feature dissimilarity, determining a correspondence mapping, and defining an image transformation are repeated until the transformed second image differs from the first image by a predetermined error.

20. The computer readable program storage device of claim 17, wherein the criteria for identifying feature points include selecting points whose local intensity variance is a maximum.

21. The computer readable program storage device of claim 17, wherein the criteria for identifying feature points include selecting points with a high local curvature.

22. The computer readable program storage device of claim 17, wherein feature vector components are selected from a group that includes the coordinates of the feature point, the intensity associated with the feature point, the local curvature associated with the feature point, a histogram of local neighborhood intensity values, and intensity values of the neighborhood points.

23. The computer readable program storage device of claim 17, wherein the dissimilarity of a pair of feature vectors can be measured by a distance between the respective feature vectors of the pair of vectors.

24. The computer readable program storage device of claim 23, wherein the distance between the respective feature vectors is selected from a group that includes a Euclidean distance, a Mahalanobis distance, a normalized cross-correlation, and a mutual information.

25. The computer readable program storage device of claim 17, wherein determining a correspondence mapping for each pair of feature points includes associating each feature vector on the first image with the closest feature vector on the second image. as determined by the smallest dissimilarity measure between the feature vector on the first image and each feature vector on the second image.

26. The computer readable program storage device of claim 17, wherein the weight assigned to each edge is based on the dissimilarity of the two associated feature vectors.

27. The computer readable program storage device of claim 26, wherein the method further includes ordering the edges based on the weight, and selecting the feature points associated with feature vector pairs with the highest weight to define the transformation between the second image and the first image.

28. The computer readable program storage device of claim 17, wherein the method further comprises identifying feature regions of interest, wherein a feature region comprises a feature point and a neighborhood of points about the feature point, and wherein the dissimilarity of two feature regions is measured over all of the corresponding points of a pair of feature regions.

29. The computer readable program storage device of claim 17, wherein the program of instructions includes a user interface that allows a user to add a feature point, remove a feature point, add a correspondence, and remove a correspondence.

30. The computer readable program storage device of claim 17, wherein the intensity corresponding to each image point on each image is a color intensity vector.

31. The computer readable program storage device of claim 30, wherein the color intensity vector comprises red, green and blue intensity values, respectively.

32. The computer readable program storage device of claim 17, wherein the image transformation can be defined by a least squares procedure.

33. A method of aligning a pair of images with a first image and a second image, wherein said images comprise a plurality of intensities corresponding to a domain of points in a D-dimensional space, said method comprising the steps of:
identifying feature points on both images using the same criteria, wherein the criteria include selecting points whose local intensity variance is a maximum and selecting points with a high local curvature;
computing a feature vector for each feature point, wherein feature vector components are selected from a group that includes the coordinates of the feature point, the intensity associated with the feature point, the local curvature associated with the feature point, a histogram of local neighborhood intensity values, and intensity values of the neighborhood points;
measuring a feature dissimilarity for each pair of feature vectors, wherein a first feature vector of each pair is associated with a first feature point on the first image, and a second feature vector of each pair is associated with a second feature point on the second image, wherein the dissimilarity can be measured by a distance between the respective feature vectors of the pair of vectors;
using the feature dissimilarity to find closest feature pairs to determine a correspondence mapping for each pair of feature points; defining an image transformation by a least squares procedure to align the second image with the first image using one or more pairs of feature points that are least dissimilar, and
adding a feature point;
removing a feature point;
adding a correspondence; and
removing a correspondence, wherein the steps of adding a feature point, removing a feature point, adding a correspondence, and removing a correspondence are performed by a user interacting with the method by means of a user interface.

34. The method of claim 33, wherein the steps of identifying feature points, computing a feature vector, measuring a feature dissimilarity, determining a correspondence mapping, and defining an image transformation are repeated for a predetermined number of iterations.

35. The method of claim 33, wherein the steps of identifying feature points, computing a feature vector, defining a feature dissimilarity, determining a correspondence mapping, and defining an image transformation are repeated until the transformed second image differs from the first image by a predetermined error.

36. The method of claim 33, wherein the distance between the respective feature vectors is selected from a group that includes a Euclidean distance, a Mahalanobis distance, a normalized cross-correlation, and a mutual information.

37. The method of claim 33, wherein determining a correspondence mapping for each pair of feature points includes associating each feature vector on the first image with the closest feature vector on the second image, as determined by the smallest dissimilarity measure between the feature vector on the first image and each feature vector on the second image.

38. The method of claim 33, wherein determining a correspondence mapping for each pair of feature points includes assigning an edge associating every feature vector on the first image to every feature vector on the second image, and assigning a weight to each edge.

39. The method of claim 38, wherein the weight assigned to each edge is based on the dissimilarity of the two associated feature vectors.

40. The method of claim 38, further including ordering the edges based on the weight, and selecting the feature points associated with feature vector pairs with the highest weight to define the transformation between the second image and the first image.

41. The method of claim 33, further comprising identifying feature regions of interest, wherein a feature region comprises a feature point and a neighborhood of points about the feature point, and wherein the dissimilarity of two feature regions is measured over all of the corresponding points of a pair of feature regions.

42. The method of claim 33, wherein the intensity corresponding to each image point on each image is a color intensity vector comprising red, green and blue intensity values, respectively.

* * * * *